United States Patent [19]
Le Guigner et al.

[11] Patent Number: 5,604,743
[45] Date of Patent: Feb. 18, 1997

[54] METHOD FOR THE PROCESSING OF DATA COMING FROM AN ADAPTATION LAYER FOR TRANSMISSION ACCORDING TO AN ATM TYPE ASYNCHRONOUS TRANSFER MODE

[75] Inventors: Marc Le Guigner; Gaëlle de Hauteclocque, both of Lannion; Michel Bourbao, Tregastel, all of France

[73] Assignee: France Telecom, Paris, France

[21] Appl. No.: 388,101

[22] Filed: Feb. 13, 1995

[30] Foreign Application Priority Data

Feb. 14, 1994 [FR] France ................................. 94 01643

[51] Int. Cl.$^6$ ........................................................ H04J 3/02
[52] U.S. Cl. ......................... 370/392; 370/395; 370/474
[58] Field of Search .............................. 370/60.1, 60, 79, 370/82, 94.2, 99, 110.1

[56] References Cited

U.S. PATENT DOCUMENTS

| | | | |
|---|---|---|---|
| 5,136,584 | 8/1992 | Hedlund | 370/94.1 |
| 5,274,768 | 12/1993 | Traw et al. | 370/94.1 X |
| 5,414,702 | 5/1995 | Kudoh | 370/60 |
| 5,420,858 | 5/1995 | Marshall et al. | 370/60.1 |

FOREIGN PATENT DOCUMENTS

WO-8007293  9/1988  WIPO .................... H04L 5/22

OTHER PUBLICATIONS

Song et al., *Optimizing Bulk Data Transfer Performance: A Packet Train Approach*, Aug. 1988, pp. 134–145; Sigmod '88 Symposium: Communications Architectures & Protocols.

Primary Examiner—Douglas W. Olms
Assistant Examiner—Russell W. Blum
Attorney, Agent, or Firm—Nilles & Nilles, S.C.

[57] ABSTRACT

Disclosed is a method for the processing of data coming from an adaptation layer for the transmission of messages in the form of a flow of cells on an ATM type asynchronous transfer network, the cells comprising a header followed by an information field. According to this method, the cells are received by a receiver terminal having a working memory and are processed so that the constituent data elements of a message are stored continuously in this memory. For this purpose, the method consists in reserving a memory location with a given maximum size in the working memory of the terminal and in continuously recording the constituent cells of one and the same message at this location. Application to transmission on an ATM network.

15 Claims, 5 Drawing Sheets

METHOD FOR THE PROCESSING OF DATA COMING FROM AN ADAPTATION LAYER FOR TRANSMISSION ACCORDING TO AN ATM TYPE ASYNCHRONOUS TRANSFER MODE

BACKGROUND OF THE INVENTION

The present invention relates to a method for the processing of data called cells, coming from the adaptation layer for transmission according to an ATM (asynchronous transfer mode) type of asynchronous transmission.

It may be recalled that transmission in ATM mode is done by the transfer of blocks of information having a constant length. The elementary quantity of useful information transmitted is 48 bytes. The information block transmitted in ATM is called a cell and is identified by a five-byte label called a header. The total length of a cell is therefore 53 bytes. It may also be recalled that the protocol of transmission according to an asynchronous mode such as the ATM makes use of different layers for the transfer of information and, notably, makes use of an adaptation layer for the ATM mode such as the AAL5 layer defined by the CCITT I362 and I363 recommendations.

The adaptation layer makes it possible, at transmission, to subdivide a message into bits that can be conveyed by ATM cells and then, at reception, to retrieve the constituent cells of one and the same message from the flow of ATM cells received in order to reconstruct the message.

The reception of the ATM flow is done by means of a reception terminal capable of processing the cells in order to reconstitute the messages and enable their exploitation. The presently used transceiver terminals carry out this segmentation and this reassembling of messages in a working pre-memory. Once the message is received, processed and reassembled, the processor of the receiver terminal is informed thereof and has to carry out the retransmission of said message to its own memory so as to be capable of exploiting it. This type of embodiment is relatively simple to design but dictates an additional step for the transfer of the data with all the appropriate additional, material resources, namely intermediate memories and read/write and control devices.

SUMMARY OF THE INVENTION

The present invention is aimed at overcoming these drawbacks. An object of the invention is a method for the processing of data that makes it possible to obtain a reassembling of the message cells directly in the working memory of the host processor (namely the reception terminal) in doing so without any intermediate step. The constituent data elements of the message are stored continuously according to the invention in this memory as and when reception occurs on the ATM channel. Thus, the invention can be used to carry out a function of reassembling cells of one and the same message in economizing an intermediate data copying step. The data elements of the messages are furthermore directly exploitable by the processor of the terminal without any additional re-ordering operation.

Another object of the invention is to permit the storage management optimization.

According to the invention, the cells are selected in function of their VPI/VCI field to be stored in a zone of memory reserved for small messages or in a zone of memory reserved for long messages. A location is reserved in the zone of memory chosen.

An object of the present invention, more particularly, is a method for the processing of data coming from an adaptation layer for the transmission of messages in the form of a flow of cells on an ATM type asynchronous transfer network, the cells comprising a header followed by an information field, wherein chiefly the cells are received by a receiver terminal having a working memory, said method comprising the following steps:

the reserving of a location in the working memory of the terminal, with a given maximum size, the continuous recording of the constituent cells of one and the same message at this location.

According to the invention another characteristic of the invention, the work memory comprises at least two zones memory and the cells are selected in function of their VPI/VCI field to be stored in one of these zones of memory.

According to another characteristic of the invention, the reservation of the location consists of the defining of a starting address and an end address and of the recording of these addresses in address control fields.

According to another characteristic of the invention,. the continuous recording comprises the following steps:

the recording, as and when reception takes place, in a memory zone, of a reception context of the cells comprising the contents of the header fields, the identifying of the cell being received by the reading of these header fields and the comparison of their contents with the contents of the message fields already being received to find out whether the cell is a starting cell, a continuation cell or an end-of-message cell, the transferring of the data from the cell into the memory at the location indicated by the contents of the address control fields.

According to another characteristic, the control fields are associated with the recorded header fields formed by the virtual path identifiers (VPI), virtual channel identifiers (VCI) and payload type (PT) indicators.

According to another characteristic, the control fields created comprise:

an address field to contain the starting address of a memory location, an address field to contain the end address of this memory location, a count-down field associated with a size of the reserved memory location to check the end of reception of the message, a time-lag field incremented by a given value and decremented by a clock to terminate the reception should the end information be lost, an error flag field to indicate the appearance of anomalies in the message.

BRIEF DESCRIPTION OF THE DRAWINGS

The present invention shall be understood more clearly from the following description, given by way of a non-restrictive illustration, and made reference to the appended drawings of which.

MORE DETAILED DESCRIPTION

Figure 1:
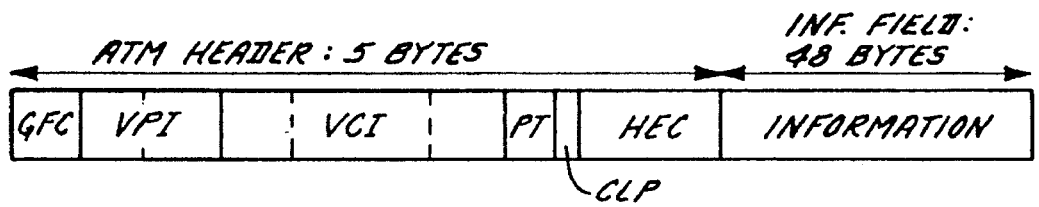
FIG. 1 shows the format of a cell transmitted according to the asynchronous transfer mode such as the ATM.

It will be recalled that the technique of transmission in ATM mode is based on the transmission of information elements by means of fixed length data packets called cells. Each cell has a 5-byte header field and a 48-byte information field according to the format shown in FIG. 1. The virtual path numbers and the virtual channel numbers are contained in the VPI and VCI fields of the cell. The cell furthermore has a cell type indicator contained in the payload type (PT) field and a cell loss priority (CLP) indicator. The field HEC corresponds to an error corrector code.

Figure 2:
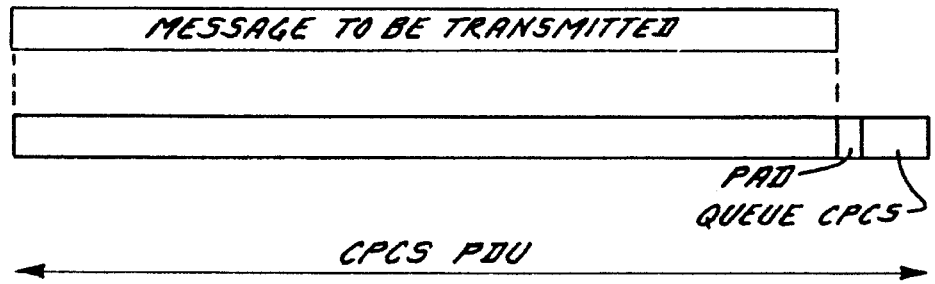
FIG. 2 shows the format of a message to be transmitted at the data transfer CPCS sub-sub-layer.

The adaptation in ATM mode, achieved by the layer AAL5, consists for a message, such as the one shown in FIG. 2, chiefly in adding information fields at the end of this message through a sub-sub-layer called CPCS.

The set of these fields is called a CPCS queue. The field PAD makes it possible solely to add bytes called filler bytes to align the field thus obtained, CPCS PDU, with a multiple of 48 bits.

Figure 3:
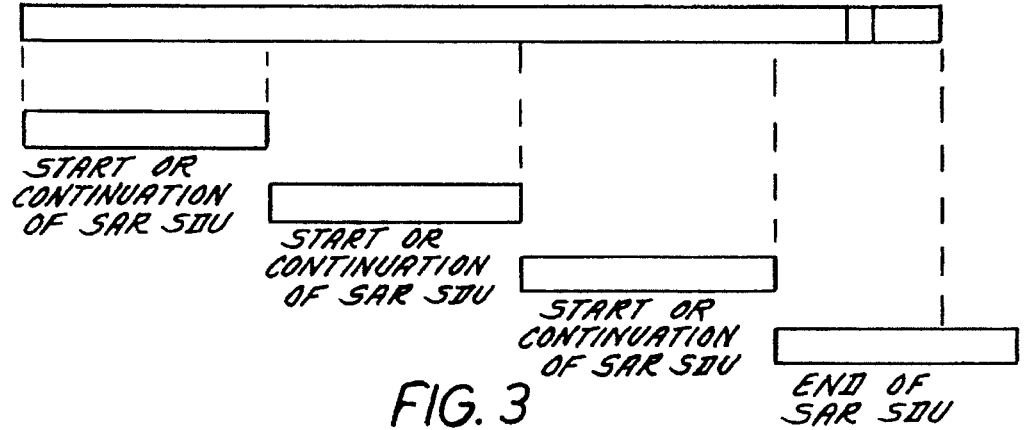
FIG. 3 shows the format of the messages to be transmitted after passage into the SAR sub-layer for adaptation to the ATM mode.
Figure 4:
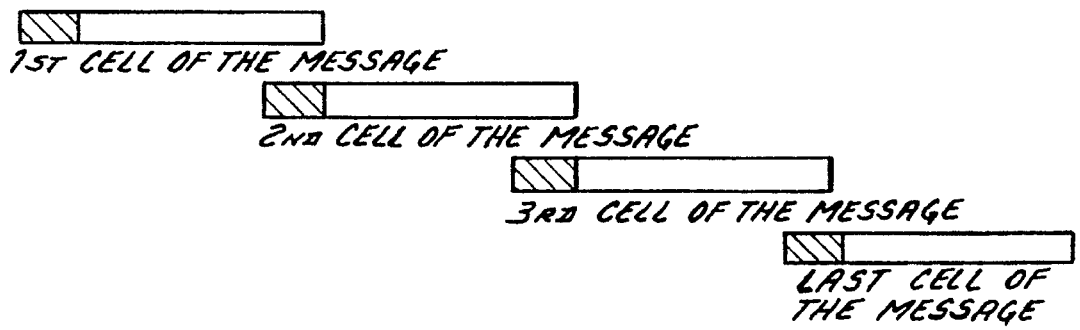
FIG. 4 shows the ATM transfer layer, FIG. 5 gives a more detailed view of the format of the message in the CPCS sub-sub-layer, FIG. 6 gives a more detailed view of the format of the message in the SAR adaptation sub-layer.

The set CPS PDU is then subdivided to form the segments of the SAR sub-layer. The SAR sub-layer is shown in FIG. 3.

These segments are then put into the ATM format by passage into the ATM layer which consists in adding an ATM header to each of them. Each information element set thus obtained forms cells according to the ATM format.

Figure 5:
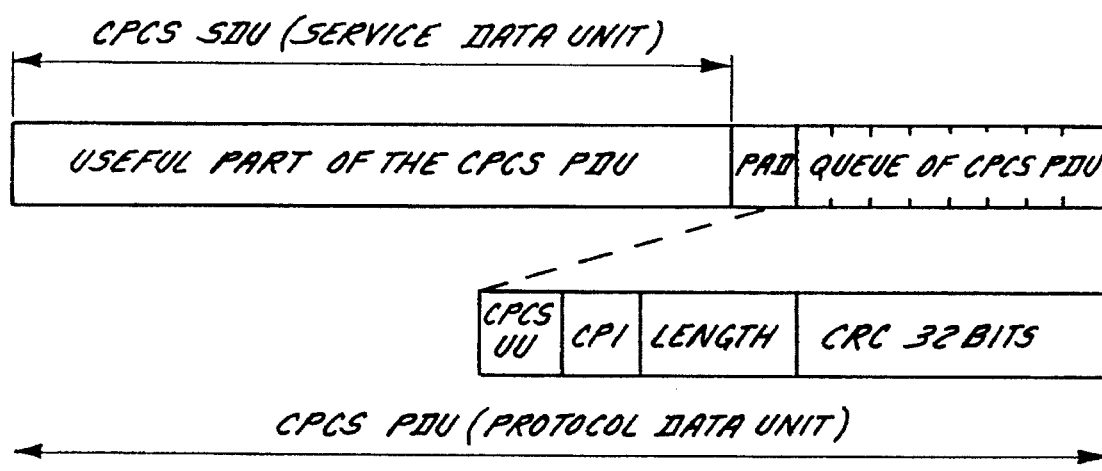

A detailed description shall now be given of the CPCS sub-sub-layer as shown in FIG. 5. The message to be transmitted is in the useful part field of this layer, this field being called CPCS SDU. The CPCS PDU queue field comprises the following fields:

CPCS UU (CPCS user-to-user indication, 1 byte): Field transparent to CPCS and designed to transfer user-to-user information.

CPI (common part indicator, 1 byte): Used to set up the value of certain fields of the CPCS PDU.

Length (length of CPCS SDU, 2 bytes): This field gives the size of the useful part of the CPCS PDU. It is used by the receiver to detect the loss or gain of information.

CRC (cyclic redundancy check, 4 bytes): This field gives the value of 32-bit CRC computed on the complete contents of the CPCS-PDU, including the useful part, the PAD field and the first 4 bytes of the queue of the CPCS-PDU.

Figure 6:
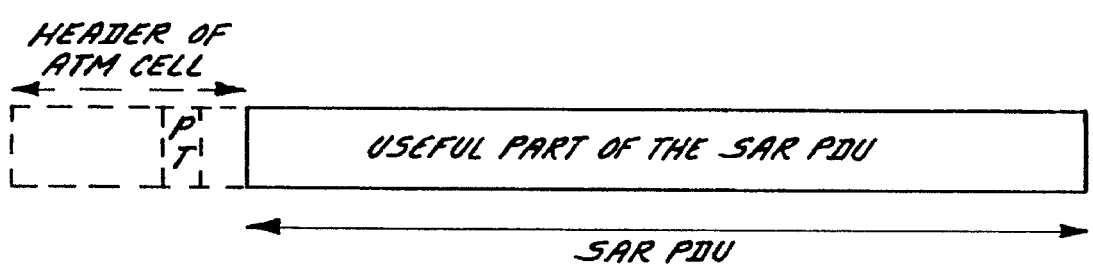

FIG. 6 gives a detailed view of the SAR sub-layer.

As has been stated, the CPCS PDU corresponding to the message to be sent is truncated into a sequence of SAR SDUs that will themselves be inserted into the useful part of the SAR PDUs.

The PT (payload type, 3 bits) field: This PT field belongs to the ATM header and is therefore related to the ATM layer. The AAL5 layer however uses the parameter AUU of this field PT. (ATM-layer-user-to-ATM-layer-user indication) to determine whether the cell is an end-of-message cell or not.

The coding is: - 0X0 for the start or sequence of a message, - 0X1 for the end of a message.

The 48 bytes of the SAR PDU form the information field of the ATM cell.

Figure 7:
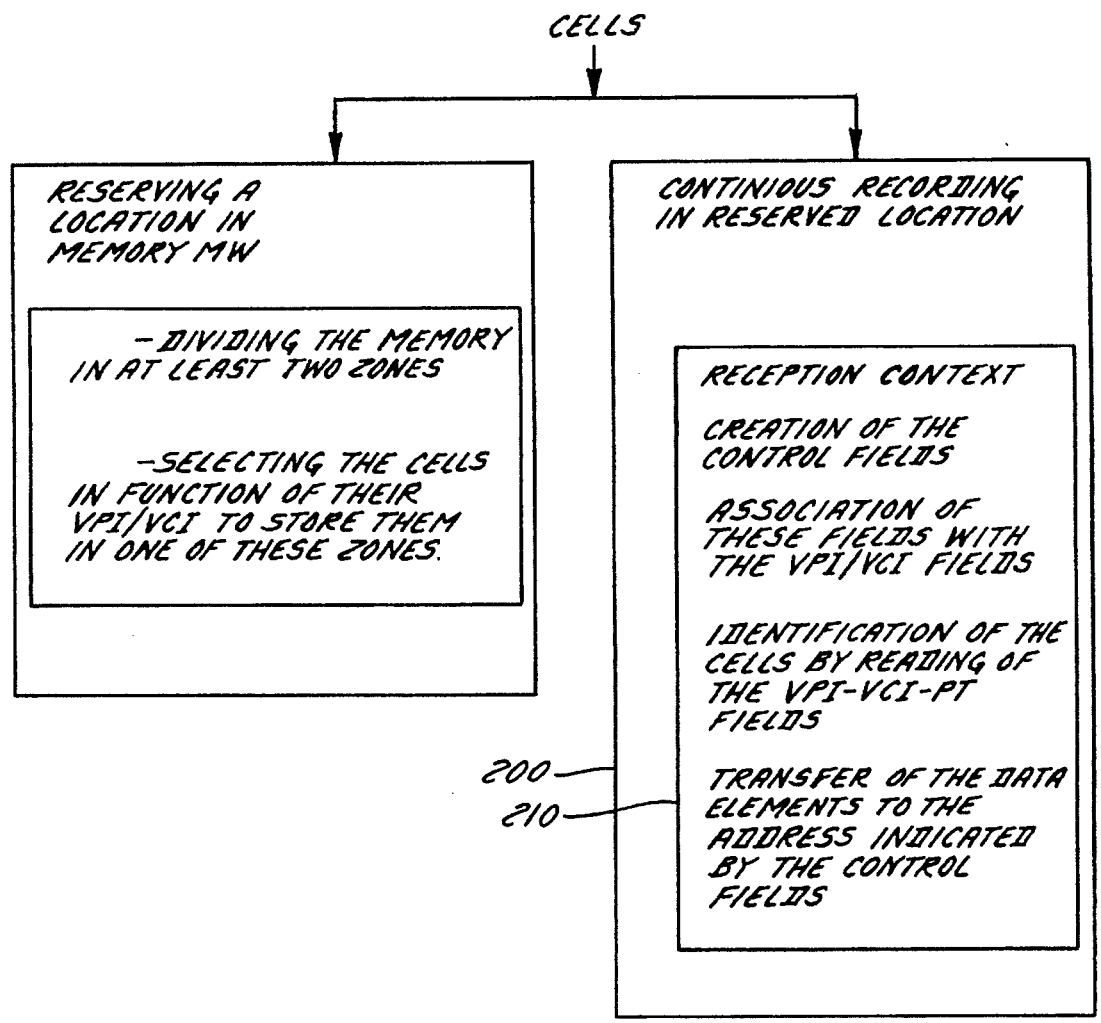
FIG. 7 shows the essential steps of the method according to the invention.
Figure 8:
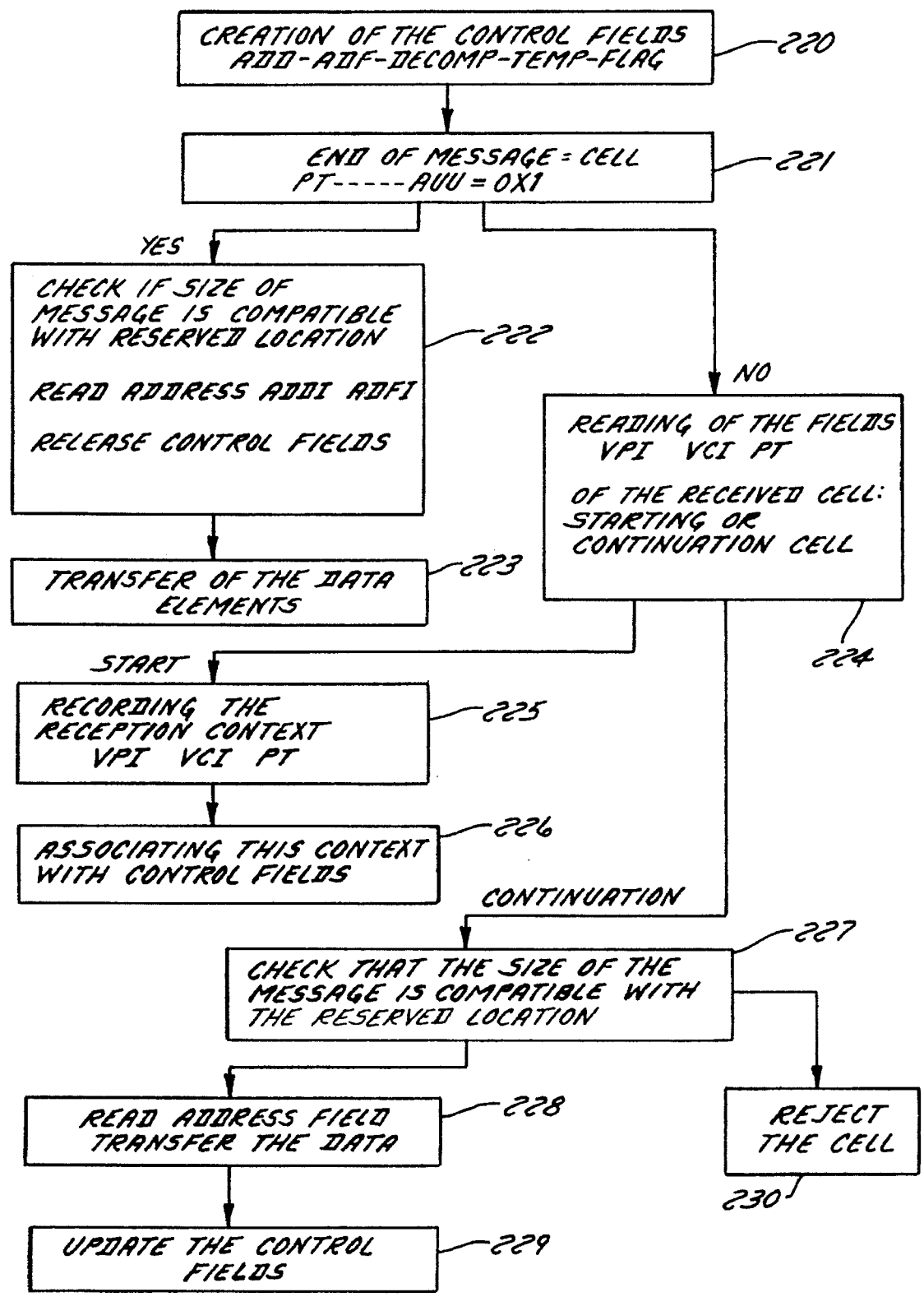
FIG. 8 shows the steps enabling the continuous recording of the cells of one and the same message.
Figure 9:
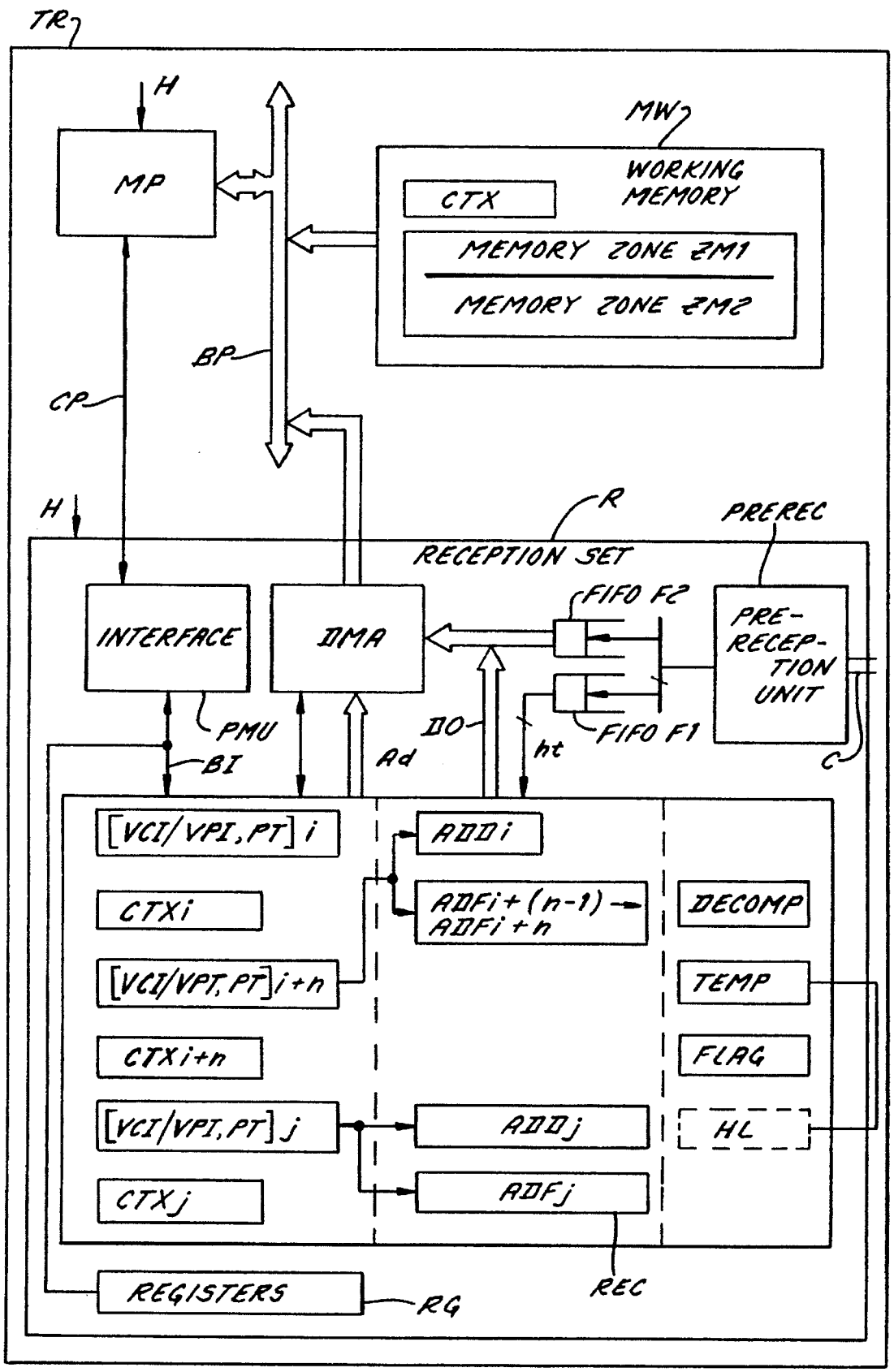
FIG. 9 shows the steps enabling the continuous recording of the cells of one and the same message in the case of continuity cells or end-of-message cells.

The description that now follows is made with reference to FIGS. 7 to 9.

According to the method of the invention, the cells are reassembled in message form directly in one of the zone of memory of the memory MW of the host processor MP, also called a reception terminal TR, without any intermediate step. The constituent data elements of the message are stored continually in this message as and when they are received at the channel C (ATM).

Thus, the reassembling function is performed by removing an intermediate step of copying data elements as was the case in the prior art. The data elements of the messages are furthermore directly exploitable by the host processor without any additional re-ordering operation.

The essential steps of the method according to the invention are represented by blocks 100 and 200 of FIG. 7.

To this end, according to the method of the invention, the reassembling process consists first of all in selecting the cells in function of their origin by the VPI/VCI and in pre-reserving (block 100) a memory location of a given size corresponding to the maximum size of the message in the zone ZM1 or ZM2 of the memory MW of the host memory TR at the start of reception of each message.

The VPI/VCI field allow to know the maximum size of the message because it gives its origin. In effect, when the VPI/VCI field corresponds to the Ethernet Net protocol, the length of the message may be of 1500 bytes, 4501 for the PDDI protocol or 1600 for the frame relay protocol.

one of the zones ZM1 or ZM2 allows for example to store long messages of the ethernet protocol and the other allows to store small messages of the other protocols.

To carry out a continuous recording (block 200), a reception context CTX of the message is recorded in a memory zone REC of the reception set R. This reception context comprises the contents of the ATM header fields, namely: VPI, VCI, PT. Then control fields are created. These fields are associated with the message and will enable the reception terminal to carry out the recording, continuously, of the cells of this message (block 200). One cell is identified per reading of the VPI/VCI pair and comparison with the recorded pairs that are already in the reception context. The contents of the field PT are examined to find out if the cell is an end-of-message cell or not.

Then, distinct processing operations are conducted on the control fields depending on whether it is an end-of-message cell or not. Then, the useful data elements are transferred to the address indicated by an address control field.

A detailed description shall now be given of the different steps enabling the recording of the useful data of a cell in the location reserved for a message being received, this recording being enabled continuously so as to achieve the direct reconstruction of the message in the working memory.

Reference can be made more particularly to the diagram of FIG. 8.

For this purpose, there are created control fields (block 220) as defined here below:

an address field ADDi to contain the starting address of a memory location, an address field ADFi to contain the end address of this memory location, a count-down field DECOMP associated with the size of the memory location reserved to check the end of reception of the message, a time-lag field TEMP incremented to a given value and decremented by a clock HL to terminate the reception should the end information be lost, an error flag field FLAG to indicate the performance anomalies in the message.

The contents of the PT field (block 221) are read to find out if the cell is an end-of-message cell.

a) If the cell is not an end-of-message cell but a starting cell (224), the reception context of this cell formed by the contents of the fields VPI, VCI, PT, (225), is recorded, with this context, there is associated the value of control fields (226) among which the address fields will contain a starting address ADDi and an end address ADFi of the memory location in which the cell will be capable of being recorded, it is ascertained that the size of the message is compatible with the size of the reserved location (227), the starting address field ADDi is read and the useful data elements are transferred from the cell to this address in the working memory (228), the control fields and notably the end address field are updated (229).

b) If the cell is not an end cell but a message continuation cell (224), it is ascertained that the size of the message is compatible with the reserved location (227), the address control fields (228) associated with the VPI/VCI fields already recorded for this message are read and the useful data of the cell are transferred to the end address indicated in these control fields, the control fields, notably the end address (229), are updated.

c) Should the cell be an end-of-message cell (222), it is ascertained that the size of the message is compatible with the reserved location, the address control fields are read to find out the end address at which the cell should be recorded and the useful data elements of the cell are transferred to this end address in the working memory, the control fields associated with this message are released and the value of these fields is transferred into the working memory (MW).

The reception set R, shown in FIG. 9, is used to implement the method according to the invention. This method is capable of taking charge of the data transfers with the working memory (MW) of the terminal TR by means of direct memory access (DMA) operations in bursts. It furthermore makes it possible to carry out operations on several different messages simultaneously irrespectively of the value of their identifier (VPI, VCI). The set enables the management of the different fields associated with the cells, checks their validity and communicates these different results to the upper layers as has been described.

This unit has a module REC to transfer the data from the useful part of the cells to the message memory MW by blocks, becoming the master of the address and data buses BP of the memory MW of the host system.

The unit PREREC takes data from the ATM adaptation circuit (channel C), separates the header information from the useful information (48 bytes) shed into the Fifo stack F2, extracts the contents of the PT field to find out if it is an end of message or not in order to present the reception unit REC with a processing request corresponding to the specific case. The reception context is in a waiting state in the Fifo stack F1.

The block PREREC works with a reception byte clock delivered by the ATM adaptation circuit. The remainder of the circuit works with the general clock H.

The unit REC uses storage means including an associative memory that enables the retrieval, for a given VPI/VCI pair, of the existence and number of a channel. This unit also uses a RAM addressed by the above number, to retrieve the reception context and, by means of these information elements, to carry out a concatenation of the segments of one and the same message in the location of the reserved message memory (writing via the DMA). Furthermore, this unit manages the time lag for the reception of each message.

The DMA unit manages the read/write operations in the message memory. It carries out two sorts of exchanges:

the operation with the highest priority is the writing of a received information segment: the transfer of 48 bytes, namely 12 words taken from the Fifo stack (received data), Fifo F2 in the diagrams. When the reception block decides to give up a cell, it is the block DMA that is entrusted with the task of extracting 48 bytes from the Fifo without writing anything in the message memory, the operation with the second highest priority pertains to the writing of a reception context in the rotating location of the reception context, namely three words read in the context memory of the reception block.

The unit PMU carries out the interfacing between the module R and the bus BP of the host MP, i.e. it controls the two-way signals, the performance of the read/write operations of the registers asked for by the MP and the associated reset operations.

The registers unit RG comprises control, interruption and status registers common to all the units.

The bus Ad is used by the reception unit REC to inform the DMA of the transfer starting address; the bus DO is used to transmit the received data (Fifo F2 to DMA) or the reception context (unit REC to DMA). The exchanges take place on this bus DO at the sporadic rate of 25 million words of 32 bits/second giving 800 Mb/s at peak speed.

Between the PREREC units and the Fifo stacks, the data elements are exchanges by bytes at the maximum rate of 19.44 MHz, giving 155.5 Mb/s.

The bus B1 enables the microprocessor MP to read or write all the internal registers.

In the Fifo F2, nx (48 information bytes) are stored;

in the Fifo F1, nx (reception context) is stored, namely n times:

VCI/VPI:16 bits/8 bits

T: 1 bit (received cell, here at 1)

TM: 1 bit (size of message=maximum size) in all: 26 bits.

In practice, n=4 will be the value taken. This amounts to storing the useful part and the reception context of four cells in the Fifo stacks.

What is claimed is:

1. A method of processing data coming from an adaptation layer of an ATM type asynchronous transfer network at an ATM receiver terminal, the data being in the form of a flow of cells, the cells each comprising a header field followed by an information field, the method comprising the following steps:

provide the ATM receiver terminal having a microprocessor coupled to a working memory, the receiver terminal being disposed on an ATM network, reserving a location in the working memory of the receiver terminal, with a given maximum size, receiving the cells with the receiver terminal, reassembling the cells in the working memory of the receiver terminal, the reassembling step including the step of contiguously recording the constituent cells of one and the same message at the location in the working memory of the receiver terminal, and exploiting the message with the microprocessor, and wherein the reassembling step and the exploiting step are performed such that the message is transferred directly from the ATM network to the working memory of the receiver terminal where it is exploited by the microprocessor without additionally transferring the message to an intermediate memory.

2. A method according to claim 1, wherein the working memory is divided into at least two zones of memory, the at least two zones being of different sizes, and wherein the cells are selected as a function of their VPI/VCI (virtual path identifier/virtual channel identifier) field to be stored in one of the at least two zones of memory.

3. A method according to claim 1, wherein the reserving step further comprises the steps of defining a starting address and an end address, and setting aside a storage zone to record the starting address and the end address in address control fields defined in the storage zone.

4. A method according to claim 3, wherein the recording step comprises the following steps:

recording, in the storage zone, a reception context of the cells, the reception context comprising the contents of the header fields, identifying a specific cell by reading its header field and comparing the contents of the header field with the contents of the message fields already received to ascertain whether the specific cell is a starting cell, a continuation cell or an end-of-message cell, and transferring the data from the specific cell into the working memory at the location indicated by the contents of the address control fields.

5. A method according to claim 3, wherein the address control fields are associated with the recorded header fields formed by virtual path identifiers (VPI), virtual channel identifiers (VCI) and payload type (PT) indicators.

6. A method according to claim 1, wherein control fields are created which comprise:

an address field which contains a starting address of a memory location, an address field which contains an end address of the memory location, a count-down field associated with the size of the reserved memory location to check the end of reception of the message, a time-lag field incremented to a given value and decremented by a clock to terminate the reception should the end information be lost, and an error flag field to indicate the appearance of anomalies in the message.

7. A method according to claim 1, wherein the recording step further comprises the following steps:

reading the contents of the PT (payload type) field to ascertain whether the cell is a starting cell, a message continuation cell, or an end-of-message cell, a) and, if the cell is a starting cell, then:

recording the reception context of this cell formed by the contents of the VPI (virtual path identifier), VCI (virtual channel identifier), PT (payload type indicator) fields, associating with this context the value of control fields among which the address fields will contain a starting address and an end address of the memory location in which the cell will be capable of being recorded, ascertaining that the size of the message is compatible with the size of the reserved location, reading the starting address field and transferring the useful data elements from the cell to the address in the working memory, and updating the control fields including the end address field, b) and, if the cell is a message continuation cell, then:

ascertaining that the size of the message is compatible with the reserved location, associating the address control fields the VPI/VCI fields already recorded for this message are read and transferring the useful data elements of the cell to the end address indicated in these control fields, and updating the control fields including the end address field, c) and, if the cell is and end-of-message cell, then:

ascertaining that the size of the message is compatible with the reserved location, reading the address control fields to ascertain the end address at which the cell should be recorded and transferring the useful data elements of the cell to the end address in the working memory, releasing the control fields associated with this message and transferring the value of these fields into the working memory.

8. A method according to claim 1, further comprising the step of linking the microprocessor and the working memory by a common address bus and a common data bus.

9. A method of processing data coming from the adaptation layer of an asynchronous transfer mode network at an ATM receiver terminal, comprising the steps of providing the ATM receiver terminal having a microprocessor and a working memory, the microprocessor and the working memory being linked by a common address bus and a common data bus, the receiver terminal being disposed on a branch of an ATM network and terminating the branch of the ATM network;

dividing the working memory into at least two zones, each of the at least two zones being of different sizes and being consistently used for different message formats;

receiving a flow of cells from the ATM network with the receiver terminal, the cells each comprising a header field and an information field;

transferring the cells from the ATM network to the working memory;

for each cell, selecting one of the at least two zones to be used for storing the cell, the selecting step being performed as a function of the message format as indicated by the header field of the cell;

reassembling and contiguously recording cells of a same message in one of the at least two zones of working memory as the cells are received from the ATM network, the message as a result being directly exploitable by the microprocessor of the receiver terminal without any further reordering of the cells;

exploiting the message with the microprocessor of the receiver terminal, wherein the microprocessor retrieves the message directly from the working memory of the receiver terminal.

10. A method according to claim 9, wherein the transferring step is performed directly such that the message is transferred directly from the ATM network to the working memory of the receiver terminal where it is exploited by the microprocessor without additionally transferring the message to an intermediate memory.

11. A method according to claim 9, wherein the message format is indicated by the VPI/VCI (virtual path identifier/ virtual channel identifier) portion of the header field.

12. A method according to claim 9, further comprising the steps of defining a starting address and an end address in the working memory, defining address control fields which record the starting address and the end address, identifying a specific cell as a starting cell, a continuation cell or an end-of-message cell, the identification being performed based on the header field of the specific cell, and transferring the data from the cell into the working memory at the location indicated by the contents of the address control fields, the manner in which transferring is performed being based on the status of the specific cell as a starting cell, a continuation cell or an end-of-message cell.

13. A method according to claim 12, wherein the address control fields are associated with header fields formed by virtual path identifiers (VPI), virtual channel identifiers (VCI) and payload type (PT) indicators.

14. A method according to claim 9, wherein control fields are created which comprise:

an address field which contains a starting address of a memory location, an address field which contains an end address of the memory location, a count-down field associated with the size of the reserved memory location to check the end of reception of the message, a time-lag field incremented to a given value and decremented by a clock to terminate the reception should the end information be lost, and an error flag field to indicate the appearance of anomalies in the message.

15. A method according to claim 9, wherein the contiguously recording step further comprises the following steps:

reading the contents of the PT (payload type) field to ascertain whether a specific cell is a starting cell, a message continuation cell, or an end-of-message cell, a) and, if the cell is a starting cell, then:

recording the reception context of this cell formed by the contents of the VPI (virtual path identifier), VCI (virtual channel identifier), PT (payload type indicator) fields, associating with this context the value of control fields among which the address fields will contain a starting address and an end address of the memory location in which the cell will be capable of being recorded, ascertaining that the size of the message is compatible with the size of the reserved location, reading the starting address field and transferring the useful data elements from the cell to the address in the working memory, and updating the control fields including the end address field, b) and, if the cell is a message continuation cell, then:

ascertaining that the size of the message is compatible with the reserved location, associating the address control fields the VPI/VCI fields already recorded for this message are read and transferring the useful data elements of the cell to the end address indicated in these control fields, and updating the control fields including the end address field, c) and, if the cell is and end-of-message cell, then:

ascertaining that the size of the message is compatible with the reserved location, reading the address control fields to ascertain the end address at which the cell should be recorded and transferring the useful data elements of the cell to the end address in the working memory, releasing the control fields associated with this message and transferring the value of these fields into the working memory.

* * * * *